(12) United States Patent
Schultz et al.

(10) Patent No.: US 8,970,782 B2
(45) Date of Patent: Mar. 3, 2015

(54) METHOD AND SYSTEM FOR REDISPLAYING TEXT

(75) Inventors: Mark Alan Schultz, Carmel, IN (US); Matthew Robert Lamb, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 236 days.

(21) Appl. No.: 12/737,238

(22) PCT Filed: Jun. 24, 2008

(86) PCT No.: PCT/US2008/007830
§ 371 (c)(1),
(2), (4) Date: Dec. 21, 2010

(87) PCT Pub. No.: WO2009/157893
PCT Pub. Date: Dec. 30, 2009

(65) Prior Publication Data
US 2011/0102673 A1 May 5, 2011

(51) Int. Cl.
| | |
|---|---|
| *H04N 7/00* | (2011.01) |
| *H04N 11/00* | (2006.01) |
| *H04N 5/445* | (2011.01) |
| *H04N 5/50* | (2006.01) |
| *H04N 5/44* | (2011.01) |
| *H04N 5/92* | (2006.01) |
| *H04N 7/088* | (2006.01) |
| *H04N 21/488* | (2011.01) |
| *H04N 21/433* | (2011.01) |
| *H04N 21/435* | (2011.01) |

(52) U.S. Cl.
CPC ......... *H04N 7/0885* (2013.01); *H04N 5/44513* (2013.01); *H04N 21/4884* (2013.01); *H04N 21/4331* (2013.01); *H04N 21/435* (2013.01)
USPC ........... 348/468; 348/564; 348/569; 348/559; 386/245

(58) Field of Classification Search
USPC .................................. 348/468, 563–564, 569
See application file for complete search history.

(56) References Cited

U.S. PATENT DOCUMENTS

| | | | |
|---|---|---|---|
| 5,500,680 A | 3/1996 | Lee | |
| 5,543,851 A * | 8/1996 | Chang | 348/468 |
| 5,623,311 A | 4/1997 | Phillips et al. | |
| 5,929,927 A * | 7/1999 | Rumreich et al. | 348/563 |
| 5,978,046 A * | 11/1999 | Shintani | 348/589 |
| 6,061,056 A * | 5/2000 | Menard et al. | 715/704 |
| 6,097,442 A * | 8/2000 | Rumreich et al. | 348/563 |
| 6,266,094 B1 | 7/2001 | Taylor, Jr. | |
| 6,417,888 B1 * | 7/2002 | Dunn et al. | 348/569 |

(Continued)

FOREIGN PATENT DOCUMENTS

| | | |
|---|---|---|
| CA | 2124390 | 8/1995 |
| EP | 0993184 | 4/2000 |

(Continued)

*Primary Examiner* — Brian Yenke
(74) *Attorney, Agent, or Firm* — Robert D. Shedd; Reitseng Lin (57) ABSTRACT

A method and system for playing a video image including video frames and on-screen displays, and displaying an on-screen display associated with a video frame already played without interrupting the playing of the video frames. The displaying of the on-screen displays can be activated by the user commands received from a user. The user can select on-screen displays associated with frames of the video image played in a past pre-defined interval.

15 Claims, 5 Drawing Sheets

(56) References Cited

U.S. PATENT DOCUMENTS

| | | | |
|---|---|---|---|
| 6,532,041 B1* | 3/2003 | Monta et al. | 348/468 |
| 6,931,587 B1* | 8/2005 | Krause | 715/205 |
| 7,050,109 B2* | 5/2006 | Safadi et al. | 348/468 |
| 7,330,640 B2 | 2/2008 | Schultz et al. | |
| 7,430,360 B2* | 9/2008 | Abecassis | 386/343 |
| 7,443,449 B2* | 10/2008 | Momosaki et al. | 348/468 |
| 7,493,018 B2* | 2/2009 | Kim | 386/241 |
| 7,551,842 B2* | 6/2009 | Chen et al. | 386/244 |
| 8,078,034 B2* | 12/2011 | Champel et al. | 386/278 |
| 2002/0122136 A1* | 9/2002 | Safadi et al. | 348/465 |
| 2002/0140855 A1 | 10/2002 | Hayes et al. | |
| 2003/0169234 A1* | 9/2003 | Kempisty | 345/158 |
| 2004/0179817 A1* | 9/2004 | Chou | 386/69 |
| 2004/0197078 A1* | 10/2004 | Yoon et al. | 386/46 |
| 2005/0188404 A1* | 8/2005 | Dacosta | 725/52 |
| 2005/0243211 A1* | 11/2005 | Kim | 348/569 |
| 2006/0044469 A1* | 3/2006 | Kim et al. | 348/515 |
| 2006/0210245 A1* | 9/2006 | McCrossan et al. | 386/95 |
| 2007/0110393 A1* | 5/2007 | Jang | 386/83 |
| 2007/0140656 A1* | 6/2007 | Ergin | 386/95 |
| 2007/0253680 A1* | 11/2007 | Mizote et al. | 386/95 |
| 2008/0170155 A1* | 7/2008 | Cooper et al. | 348/564 |
| 2008/0279535 A1* | 11/2008 | Haque et al. | 386/95 |
| 2009/0040378 A1* | 2/2009 | Momosaki et al. | 348/468 |

FOREIGN PATENT DOCUMENTS

| | | |
|---|---|---|
| WO | WO9827722 | 6/1998 |
| WO | WO2007064340 | 6/2007 |

* cited by examiner

METHOD AND SYSTEM FOR REDISPLAYING TEXT

This application claims the benefit, under 35 U.S.C. §365 of International Application PCT/US2008/007830, filed Jun. 24, 2008, which was published in accordance with PCT Article 21(2) on Dec. 30, 2009 in English.

FIELD OF THE INVENTION

The present invention generally relates to a method and system of redisplaying text, in particular, the closed caption (CC) on a television (TV).

BACKGROUND OF THE INVENTION

There are times when watching TV that a viewer did not understand what was said or the viewer was interrupted by a person, doorbell, or some other noise and did not hear what was said. Currently, there is no system that can solve this problem. At best, in existing systems, the viewer can freeze the screen or the CC, but none of them can satisfactorily solve the above problem because the missed audio segment is already gone.

Figure 1:
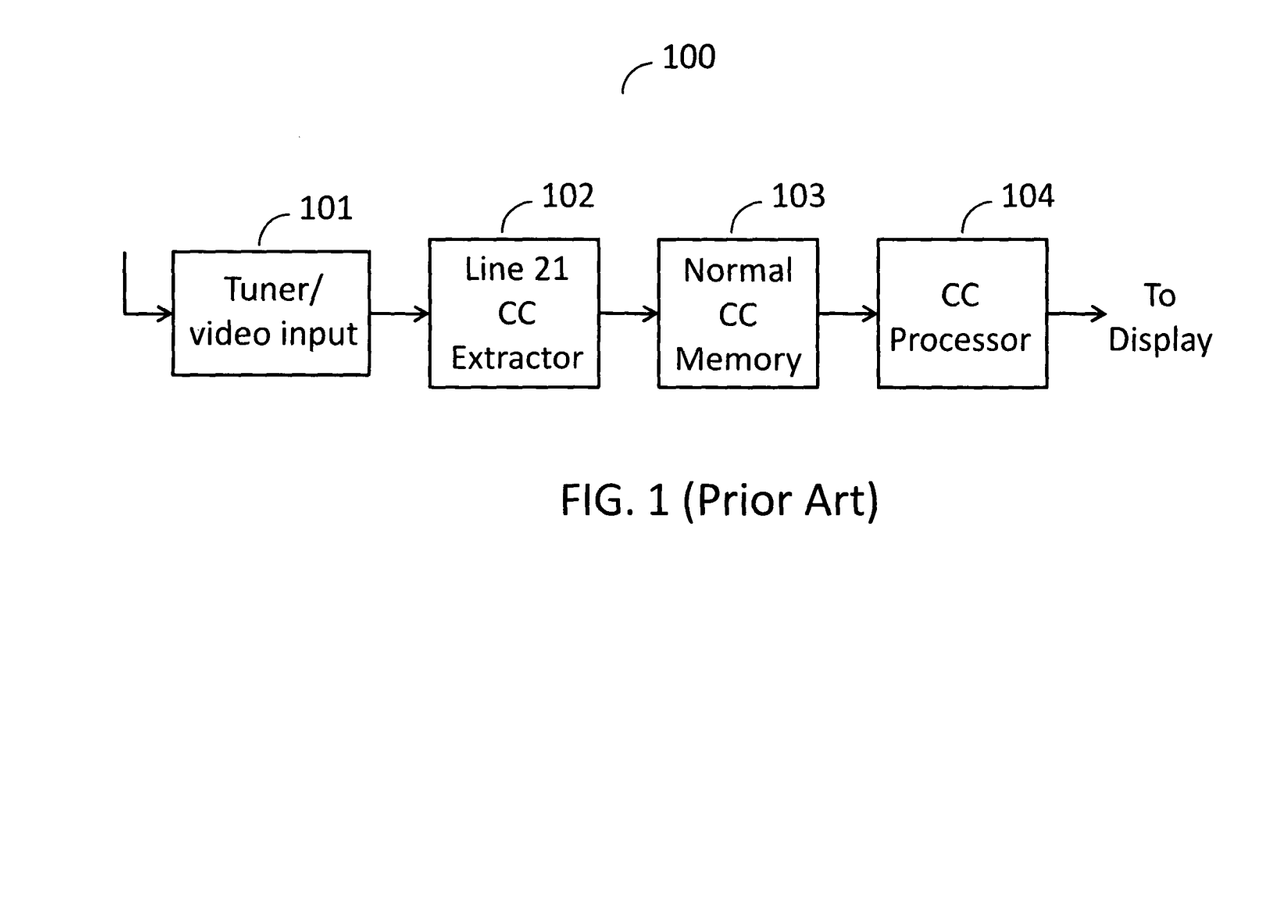
FIG. 1 shows a system that performs a standard TV CC processing.

FIG. 1 shows a system 100 that performs a standard TV CC processing. The tuner/video input 101 receives video from a video source. The line 21 CC extractor 102 then extracts the CC data from the received video. The extracted CC data is sent to the normal CC memory 103, and the CC processor 104 processes the CC data in the normal CC memory 103 and sends the CC to a display. With the current systems, since the CC data that have been sent to the display are no longer available, if the viewer missed an audio segment, there is no way to review what was said. Freezing the screen or the CC could only keep the text currently being displayed on the screen, but it could not recall the text that has already been shown.

SUMMARY OF THE INVENTION

In view of the above problems, certain embodiments herein provide buffering of text and displaying multiple lines in a compressed time. Upon activation of a special display mode, the already displayed text can be recalled and redisplayed. This helps solve the issue of "What did he say?" from both clarifying what was said and/or repeating a missed audio segment due to an interruption.

This invention includes a method and system for playing a video image including video frames and on-screen displays, and displaying an on-screen display associated with a video frame already played without interrupting the playing of the video frames.

BRIEF DESCRIPTION OF THE FIGURES

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

An embodiment of the invention demonstrates how to implement a closed caption (CC) replay function from a command, which may be received from a remote or a front panel array in a TV receiver, to display the past 30, 60, 90, or x seconds of CC using either the CC function or the TV receiver OSD (On-Screen Display) function. Using this feature, the viewer would only have to activate a special function to trigger a CC buffer that will replay the CC data from the past 30, 60, 90, or x seconds. The replaying include, for example, scrolling up the display screen for a quick review, for example, using a button in a remote or a front panel array.

To activate the special function the user may press a button or a sequence of buttons on a remote or a front panel array. Other means of activating the special function may be readily apparent to one skilled in the art. In other embodiments, the activation of the special function would turn on the CC, even if the CC is off under normal situations. After replaying, the CC then would return to the same state prior to the activating the special function.

Figure 2:
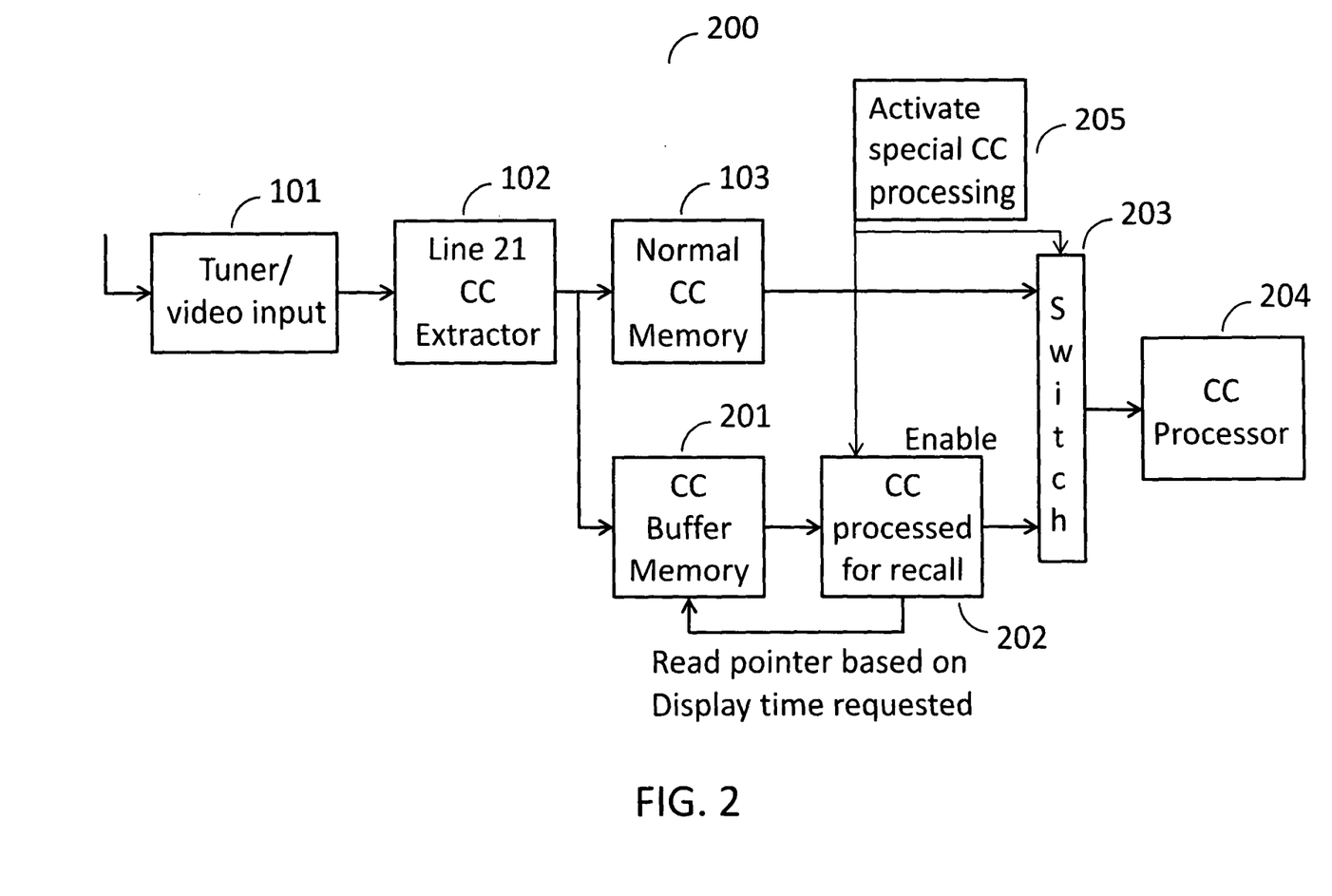
FIG. 2 shows an example embodiment of a system that performs a modified CC processing.

FIG. 2 shows an exemplary embodiment where a system 200 performs a modified CC processing according to the principles of the present invention. As in FIG. 1, the tuner/video input 101 receives video from a video source, such as a media player or a TV broadcast. The line 21 CC extractor 102 extracts the CC data from the received video. For most types of NTSC programming, CC data is in the line 21 or line 284 of the vertical blanking interval (VBI). After the CC data is extracted by the line 21 CC extractor 102, the extracted CC data goes to the CC buffer memory 201 and to the normal CC memory 103. During normal CC processing, the switch 203 switches the normal CC memory 103 to the CC processor 204. The CC processor 204 processes the CC data in the normal CC memory 103 and sends the CC to a display. Typically, during the normal CC processing the CC text is displayed from the top or bottom few rows (lines).

When the special CC processing mode is activated, the system 200 saves all the current CC settings so that the system 200 can revert back to these settings after exiting the special mode. In certain embodiments the system 200 clears the display of CC text from normal CC text processing or if CC text processing is turned off, the activation of the special CC processing mode will turn on and enable CC processing. In addition, the system 200 may in certain embodiments define a background and a text color in order to indicate that the special mode has been activated.

The system 200 will also set up a line pointer for displaying the first character of the CC text of the special mode. As pointed out above, CC text is normally displayed from the top or bottom few rows, however, in one embodiment of the present invention the special mode CC text is started at row 7. This allows multiple lines of CC text to be rapidly displayed. The system 200 also determines a memory read pointer based on the display time requested. For example, in the normal course of watching TV, CC is received at 60 characters per second. A replay time of 60 seconds would be 3600 characters back in memory, assuming a CC rate of 60 characters per second. A 90 second replay would be 5400 characters back in memory. The memory required to store the data in the 90 second example is only about 90×60=5400 bytes. Thus, the pointer determines where in the CC buffer memory 201 the reading of data should be started from and depends upon the replay time.

After the CC data is read form the CC buffer memory 201 it is processed and reformatted so that the CC can be fast displayed on multiple lines. When processing the CC data, the system 200 first searches for first carriage return and skips over all characters until a carriage return is found. After finding the carriage return the system 200 then determines if the next character after the carriage return is a control character, i.e., the CC data starts with a 001xxxx and is not a carriage return (001x10x0101101). If the system 200 finds such a control character that is not a carriage return the system 200 skips over this byte and the next byte. If the next character is a carriage return, the system 200 does a carriage return to go to the next display line. If the next character after a carriage return does not start with 001xxxx, then it should be an ASCII character and the system 200 keeps it and sends it to the display. See description of step 403 in FIG. 4 for details.

The process continues until the end of buffer is reached. The CC processed for recall 202 is switched to the CC processor 204 by the switch 203, and the CC text is displayed. When the special display mode is finished, the system 200 returns to the previous saved CC settings.

In addition to the above processing the system 200 ensures that no line receives more than 32 characters for display in each row. If the 32 characters limit has been reached, the system 200 inserts a carriage return, thus limiting the characters in each line.

Figure 3:
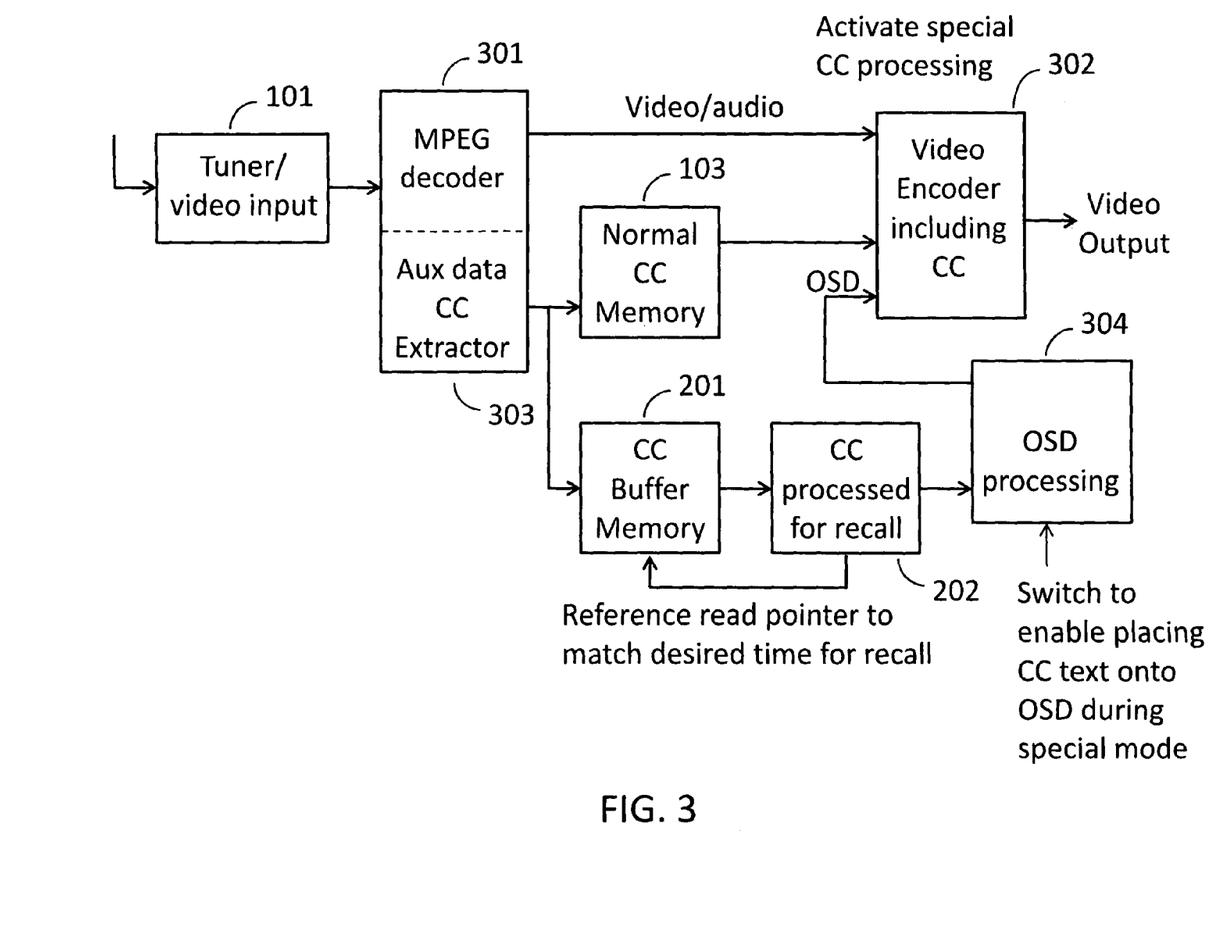
FIG. 3 shows an example embodiment of a system that performs a Set-Top Box MPEG CC processing using OSD.

FIG. 3 shows an exemplary embodiment of the present invention implemented in a set-top box. As in FIG. 1, the Tuner/video input 101 receives video and audio from a video source, such as a media player or a TV broadcast. The MPEG decoder 301 decodes the video and audio and sends the data to the video encoder 302. The auxiliary (Aux) data CC extractor 303 extracts the CC data and sends the data to both the normal CC memory 103 and the CC buffer memory 201. Before the activation of the special CC processing, the CC data is sent to the video encoder 302 from the normal CC memory 103, and the video encoder including CC 302 sends the data to the video output.

When the special CC processing mode is activated, the system 300 processes the CC data for recall in a similar way as described above for FIG. 2. The system 300 processes the CC data stored in the CC buffer memory 201 for recall and prepares to send the characters to OSD processing 304. The OSD processing 304 is switched to enable placing the CC text from the CC processed for recall 202 onto the OSD during special mode, and the OSD is sent to the video encoder 302. When the special display mode is finished, the system 300 returns to the normal CC settings.

In another embodiment, the normal CC memory 103 may be eliminated in FIGS. 2 and 3 and its function is performed by the CC buffer memory 201 and CC processed for recall 202. In this embodiment, the CC processed for recall 202 outputs normal CC data during a normal CC display mode and outputs replayed CC data during a special CC display mode. Thus, the switch 203 in FIG. 2 may be eliminated.

An exemplary embodiment of the present invention includes a processor 204 for playing a moving picture image including video frames and on-screen displays and displaying an on-screen display associated with a video frame already played without interrupting the playing of the video frames.

Additionally, exemplary embodiment of the system may include a user command receiver 205 (e.g. remote control receiver), such that the displaying is performed in response to a command received by the user command receiver. The user can activate the special CC process by pressing a special key or a sequence of keys on the remote.

The system may also include a media player for playing the moving picture image from a media source. The system may also include a broadcast receiver for receiving the moving picture image from a broadcast source. The system can display subtitles for the media contents or closed captions from the media or broadcast source, and can contain a memory 201 for storing the on-screen displays. Also the stored on-screen displays can correspond to on-screen displays associated with frames of the moving picture image played in a past predefined interval, such as the past 30, 60, 90, or x seconds of CC. Additionally, the display processor can display an on-screen display associated with a video frame being played.

The present invention also relates to a method for playing a moving picture image including video frames and on-screen displays, and displaying an on-screen display associated with a video frame already played without interrupting the playing of the video frames. The displaying of the on-screen displays can be activated by the user commands received from a user. For example, the user can activate the special CC process by pressing a special key or a sequence of keys on the remote. The method can include receiving the moving picture images from a number of sources, such as a media player or a broadcast source. Examples of media players are DVD player, VHS player, etc. Examples of broadcast sources are over-the-air TV, cable TV, satellite TV, etc. The on-screen displays can be closed captions or subtitles for the media contents, or closed captions from the broadcast source, and the on-screen displays can be stored in memory. The stored on-screen displays can correspond to the past 30, 60, 90, or x seconds of CC. The user can select on-screen displays associated with frames of the moving picture image played in a past pre-defined interval. The on-screen display associated with a video frame being played, can also be shown.

Figure 4:
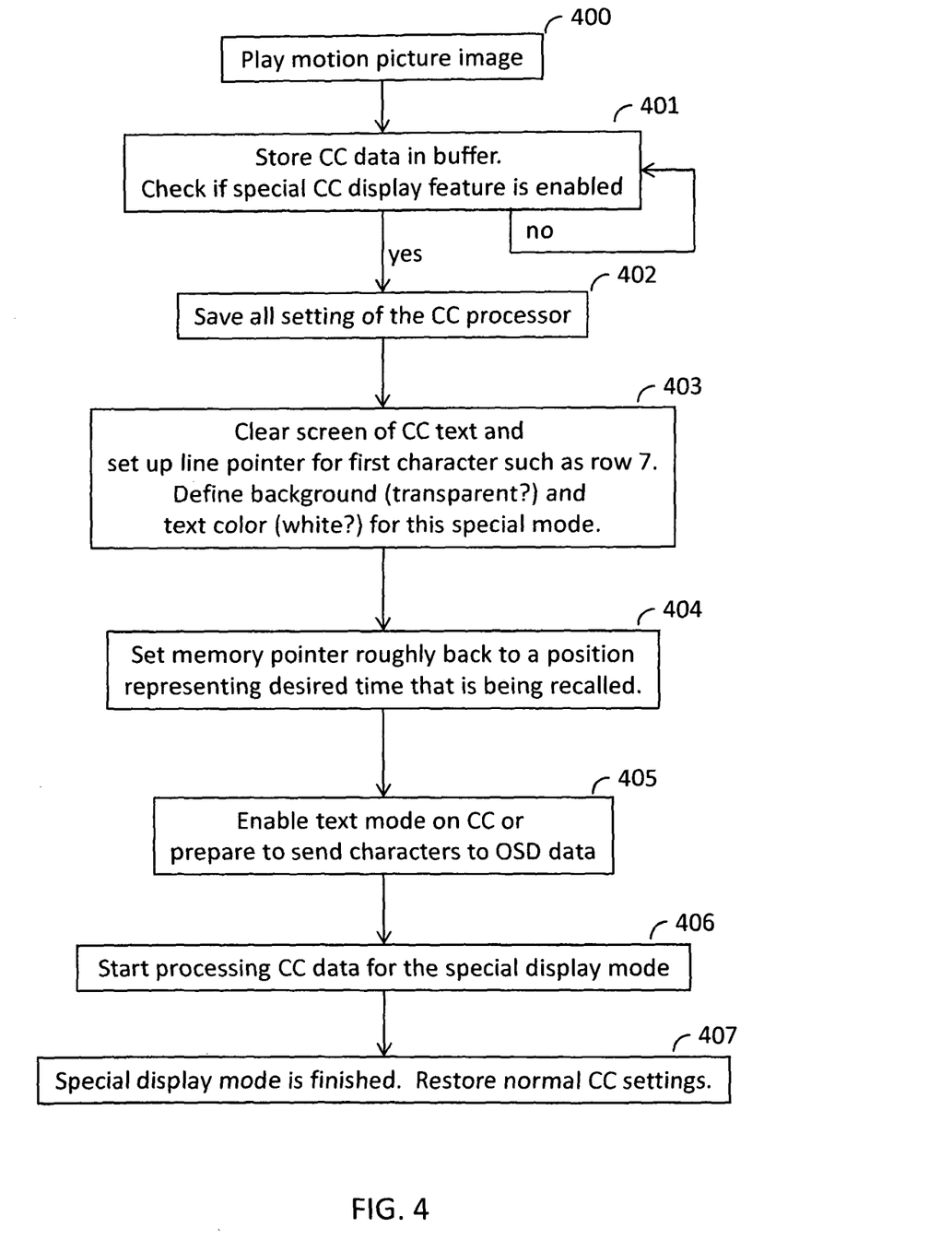
FIG. 4 illustrates an example embodiment of a method of displaying CC text.
Figure 5:
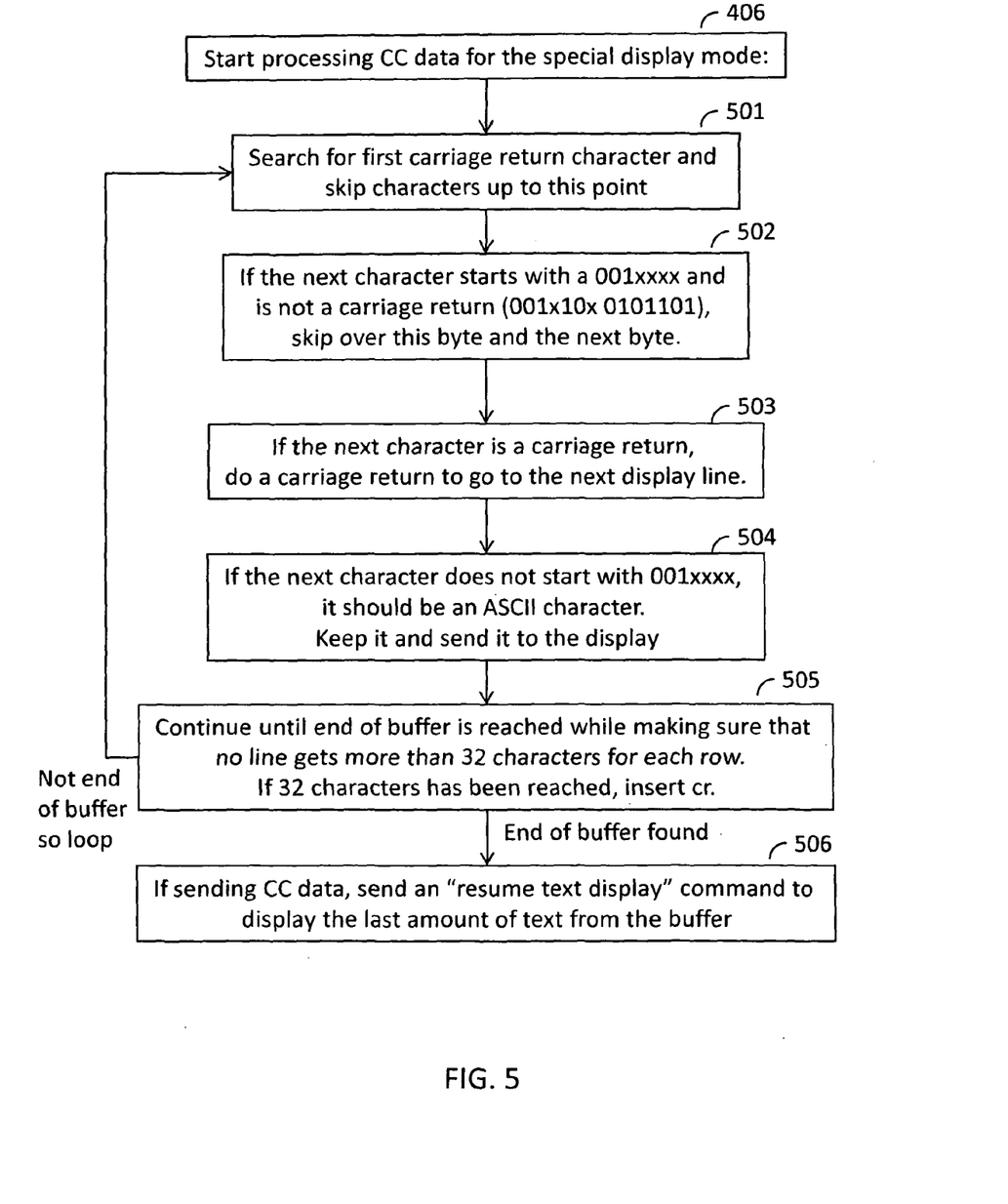
FIG. 5 illustrates an example embodiment of a processing of CC data for the special display mode.

FIG. 4 and FIG. 5 show an exemplary implementation of a method according to the principles of present invention.

At 401 of FIG. 4 the CC data is continually stored for a period of time depending upon the maximum recall length of the system. The system is also monitoring whether the special CC processing mode has been enabled. If enabled, go to 402, otherwise the check loop continues.

At 402 all the current CC settings of the system are saved.

At 403, clear the screen of CC text and set up the line pointer for starting with row 7 using, for example, white letters with a transparent background (text restart—001x10x0101010, row7—white 001x110100000x, transparent background 001x1110101101). Note that the two bytes of information are represented by two 7 bit codes with the two 8th bits being odd parity bits. The x's in the lines represent either a 0 or a 1 and the 8th bit is not shown since it is a function of the value of x's. Text restart—001x10x0101010 could be shown as (001x10x+odd parity bit)=8 bits and 0101010+odd parity bit of 0=01010100 for 8 bits. In this embodiment, the first 7 bits specify the data channel and the line number for retrieving the CC data. If the fourth bit (the leftmost bit is referred to as the first bit) is 0, it represents data channel 0 and if it is 1, it represents data channel 1. If the seventh bit is 0, it represents line 21 and if it is 1, it represents line 284. Other code formats, such as extended ASCII, can be used as well.

At 404, set the memory pointer to the appropriate memory location that roughly matches the requested replay time.

At 405, enable the text mode (text restart code) or prepare to send characters to OSD data.

At 406, start the processing of the CC data for the special display mode. The processing steps are illustrated in FIG. 5.

At 407, restore original CC settings and continue with normal CC data or turn off CC data if previously turned off.

An exemplary implementation of the processing of the CC data for the special display mode 406 is shown in FIG. 5.

At 501, parse through the data and look for a carriage return (001x10x0101101).

At 502, if the next character starts with a 001xxxx and is not a carriage return (001x10x0101101), skip over this byte and the next byte.

At 503, if it is a carriage return, do a carriage return, i.e., go to the next line.

At 504, if the next character does not start with 001xxxx, it should be an ASCII character and keep it and display it.

At 505, continue through this loop in steps 501-504 until the end of the buffer is reached but check for the following:
 a. No line ever gets more than 32 characters. If it does, insert a carriage return after 32 characters or after the last space that occurred on the line.
 b. Drop all special non-display characters. (This is an implementation option where the implementer might want to keep the color or some specific characters as a feature).

At 506, at the end of the buffer, send a carriage return. Send end of text mode.

In another embodiment, the present invention can be implemented by storing the CC commands in memory as they arrive, processing the data, stopping the normal arrival of CC, and then sending a preformatted set of CC data to the CC processor to minimize the disruption in the TV software.

According to the inventive principles as disclosed in connection with the preferred embodiment and other embodiments, the invention and the inventive principles are not limited to any particular kind of set-top-box, TV or computer, but may be used with any general purpose video display product, as would be known to one of ordinary skill in the art, arranged to perform the functions described and the method steps described. Although illustrated as playing a moving picture image, the invention can be applied to playing back an animation or a series of still images with caption associated with one or more of the video frames involved.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure.

The invention claimed is:

1. A method comprising:
 playing a single video image including video frames and a single on-screen display at a time, said single on-screen display at a time extracted from a first memory and processed for playing in the single video image by a video processor;
 receiving an identification of a prior on-screen display associated with a prior video frame already played, wherein said identification indicates the prior on-screen display via a time interval measured prior to a time of a current video frame being played, the prior on-screen display including at least one of a subtitle and a closed caption;
 determining, via a recall processor and based on the time interval indicated in said identification, a memory read pointer associated with a particular location in a second memory for locating and extracting the prior on-screen display stored in the second memory, wherein the extracted prior on-screen display has occurred prior to the current video frame by an amount of time substantially as set forth in the identification; and enabling, via the video processor, display of at least the extracted prior on-screen display associated with the prior video frame already played together with said current video frame and any subsequent video frames, said at least the extracted prior on-screen enabled for display to play as the single on-screen display at a time in the single video image without interrupting said playing of said current video frame and any subsequent video frames in said single video image, wherein said enabling display includes displaying said at least one of the subtitle and the closed caption included in the extracted prior on-screen display on multiple lines at a first location that is other than a second location normally used for displaying on-screen displays for the current video frame and at a first line display rate that is faster than a second line display rate normally employed for an on-screen display for the current video frame.

2. The method of claim 1, further comprising
receiving a user command, wherein said displaying is enabled and performed in response to receiving said user command and wherein the user command includes said identification.

3. The method of claim 1, further comprising
receiving said video image from a media player.

4. The method of claim 1, wherein the extracted prior on-screen display is realized in a visually perceptible manner to indicate initiation of a special display mode a.

5. The method of claim 1, further comprising
receiving said video image from a broadcast source, and wherein the on-screen displays for the video image are closed captions.

6. The method of claim 4, wherein the initiation of the special display mode is indicated by utilizing a designated background color and text color for the extracted prior on-screen display.

7. The method of claim 1, further comprising
storing said on-screen displays in the first memory; and
storing prior on-screen displays in the second memory.

8. The method of claim 1, further comprising
enabling display of a current on-screen display associated with the current video frame being played.

9. A system comprising:
a video processor for playing a single video image including video frames and a single on-screen display at a time, said on-screen displays extracted from a first memory and processed for playing as the video image by a video processor;
a user command receiver for receiving an identification of a prior on-screen display associated with a prior video frame already played, wherein said identification indicates the prior on-screen display via a time interval measured prior to a time of a current video frame being played, the prior on-screen display including at least one of a subtitle and a closed caption;
a recall processor for determining, based on the time interval indicated in said identification, a memory read pointer associated with a particular location in the second memory for locating and extracting the prior on-screen display in the second memory, wherein the extracted prior on-screen display has occurred prior to the current video frame by an amount of time substantially as set forth in the identification; and
said video processor enabling display of at least the extracted prior on-screen display associated with the prior video frame already played together with said current video frame and any subsequent video frames, said at least the extracted prior on-screen enabled for display to play as the single on-screen display at a time in the single video image without interrupting said playing of said current video frame and any subsequent video frames in said single video image, wherein said enabling display includes displaying said at least one of the subtitle and the closed caption included in the extracted prior on-screen display on multiple lines at a first location that is other than a second location normally used for displaying on-screen displays for the current video frame and at a first line display rate that is faster than a second line display rate normally employed for an on-screen display for the current video frame.

10. The system of claim 9, further comprising
a user command receiver, wherein said displaying is enabled and performed in response to a user command received by said user command receiver and wherein the user command includes said identification.

11. The system of claim 9, further comprising
a media player for playing said video image from a media source.

12. The system of claim 9, wherein the extracted prior on-screen display is realized in a visually perceptible manner to indicate initiation of a special display mode.

13. The system of claim 12, wherein the initiation of the special display mode is indicated by utilizing a designated background color and text color for the extracted prior on-screen display.

14. The system of claim 9, further comprising
a broadcast receiver for receiving said video image from a broadcast source, and wherein the on-screen displays for the video image are closed captions.

15. The system of claim 9, wherein said video processor displays a current on-screen display associated with the current video frame being played.

* * * * *